US009954889B2

United States Patent
El-Moussa (10) Patent No.: US 9,954,889 B2
(45) Date of Patent: Apr. 24, 2018

(54) METHOD AND SYSTEM FOR MALICIOUS CODE DETECTION

(71) Applicant: BRITISH TELECOMMUNICATIONS public limited company, London (GB)

(72) Inventor: Fadi El-Moussa, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 61 days.

(21) Appl. No.: 14/386,932

(22) PCT Filed: Mar. 20, 2013

(86) PCT No.: PCT/GB2013/000124
§ 371 (c)(1),
(2) Date: Sep. 22, 2014

(87) PCT Pub. No.: WO2013/140117
PCT Pub. Date: Sep. 26, 2013

(65) Prior Publication Data
US 2015/0058992 A1    Feb. 26, 2015

(30) Foreign Application Priority Data

Mar. 20, 2012  (EP) .................................. 12250066

(51) Int. Cl.
*H04L 29/06*     (2006.01)

(52) U.S. Cl.
CPC ........ *H04L 63/145* (2013.01); *H04L 63/1416* (2013.01)

(58) Field of Classification Search
CPC .......................... H04L 63/145; H04L 63/1416
See application file for complete search history.

(56) References Cited

U.S. PATENT DOCUMENTS 8,307,432 B1 *  11/2012  Feng .................... G06F 21/56
                                                 726/22
8,555,391 B1 *  10/2013  Demir .................. H04L 67/20
                                                 713/187

(Continued)

OTHER PUBLICATIONS

Luis Campo-Giralte, "PolyVaccine: Protecting Web Servers against Zero-Day, Polymorphic and Metamorphic Exploits" , 2009, pp. 91-99.*

(Continued)

*Primary Examiner* — Wasika Nipa
(74) *Attorney, Agent, or Firm* — Nixon & Vanderhye P.C.

(57) ABSTRACT

Embodiments of the invention are directed towards detecting and identifying malicious code injected into other legitimate web pages. The detection is divided into two processes. The first process is to detect a malicious code string within received web page code using a set of one or more criteria. The criteria include length of the string, as well as whether the string changes between received instances, and the status of the string within the web page code, particularly whether it is encapsulated between scripting tags, or otherwise indicated as being executable. The second process is based on using a proxy that will help in extracting and scanning the decrypted code against any malicious content. In particular, the second phase acts to remove the armour and evasion features that may be built into the malicious code, so that the code may then be inspected by the existing anti-virus or other host intrusion detection system (HIDS) present on the target system. Inspection may take place by dumping the memory contents to a file and then passing the file for inspection to the existing anti-virus or other HIDS.

14 Claims, 6 Drawing Sheets

(56) References Cited

U.S. PATENT DOCUMENTS

| | | | | |
|---|---|---|---|---|
| 8,607,340 B2* | 12/2013 | Wright | ................. | G06F 21/552 |
| | | | | 726/22 |
| 8,839,428 B1* | 9/2014 | Oliver | ..................... | G06F 21/52 |
| | | | | 709/224 |
| 8,839,431 B2* | 9/2014 | Bennett | ................... | G06F 21/51 |
| | | | | 726/22 |
| 9,064,130 B1* | 6/2015 | Asheghian | .......... | G06F 21/6281 |
| 2003/0093692 A1* | 5/2003 | Porras | ..................... | G06F 21/55 |
| | | | | 726/4 |
| 2009/0282485 A1 | 11/2009 | Bennett | | |
| 2010/0235913 A1* | 9/2010 | Craioveanu | ........... | G06F 21/563 |
| | | | | 726/23 |

OTHER PUBLICATIONS

International Search Report for PCT/GB2013/000124, dated Jul. 2, 2013.

European Search Report dated Sep. 27, 2012, issued in EP 12 25 0066 (8 pages).

Zhao, et al. "Automatic Extraction of Secrets from Malware", Laboratory of Security Engineering for Future Computing (SEFCOM),Reverse Engineering (WCRE) 2011, 18th Working Conference on, IEEE, Oct. 17, 2011, (10 pages).

Wang, et al., "Thwarting Zero-Day Polymorphic Worms With Network-Level Length-Based Signature Generation", IEEE Transactions on Networking, vol. 18, No. 1. Feb. 2010 (14 pages).

* cited by examiner

JPhAG7E4USeAG28E_Vd_GnhA5C93Gc8_aTiwUnh0UTiY52m_w7f1USQYWIF0I3
oYX7EYgSQYpSdYHSZYW7fXW7fXGnR4z68_JniQj@lwrThEeJR0puhApSdYGOlAn
2e1U6RYInfYJ2QYUThYJ2QYJ7EEgPoKWSQYL7hAJBMYJ2QYUrhApSdYGx7YnTh
AJ2QYh7hAJTZYwPluIgFAJ6ZYUThEn2e1U2e1U6hAUnhAUnRYn2lQg7o1I7EYUn
RKU6mYFBIYF2Q4WvaYp7f3JThAOkiKi68_UnRYJ2IAF69EUTiYG6ECF6T_GM8ErS
Q4SS8EUTEY57RQUvIAG2QYW7fXXSd1UVIAS@Z4BTmAJT8Y5ThA5SQYmgTYru
E4iTFAmJhAmJhAW7iWN58KJFmAUFh0wSyYm3F_anRYhJfYUBIAnnfEG6EYUTh
AB2yYUTE4JTF1eFiQUTRYJ2QYJ7EEUThAI2e1U6RYhJfYJ2QYUBhAG2QYJ7EEOP
8KWSQYq7hAJTZYwSQYJnhAJnR@WStY5SZYX7aYOS8XU2I0Jc9Yr7ZYJse1aseA
GnEKGT81F2dEUBIAvk91j2QYX7f_c7R0B2yYGOmAWVa8HThEi2eAG_l0aSy4Wb
d3HTmuePECJOM1JOFAI@I0Unf4N7RQJ7RKN7iDU2IAJ28QUxawU6i_Unh0Unh0
UrmAUndZpSeuGnEYHxhAGO8Y57ZYaFiQUThuwIlwIgFAJ2EYUTE4JTFAJ2ewUBI
AnnRYG6EYUThAN2yYUTE4JTo1iviQUTECJ2QYJ7EEUThAn2e1U6RYNJfYJ2QYUx
hAG2QYIgoEIgFAB@hA5@hAJ2e_U@fYr7ZYUThAUS94pgf3gghwNJRYJ2IAa2QY
WPaYp7f3r7hAJ2Q4N7f3J_RKJThASuEYpSe0nMewJ@f4nTmAJTmAGFiwJ2e0Un
hAUnEEixi4a_l0NSe1G2dsJOZYWSa8UntYJO8YX7fYWP8YWP8YWJf1z2e0pSe1n
6Rw52QYUMe1U_RQpPZKW7E4JTF1

Figure 6

```
<html>
<head>
<script type="text/javascript">
    function Suspicious() {
        var Mal=
eval(JPhAG7E4USeAG28E_Vd_GnhA5C93Gc8_aTiwUnh0UTiY52m_w7f1USQYWIF0I3oYX7
EYgSQYpSdYHSZYW7fXW7fXGnR4z68_JniQj@IwrThEeJR0puhApSdYGOIAn2e1U6RYInfY]2
QYUThYJ2QYJ7EEgPoKWSQYL7hAJBMYJ2QYUrhApSdYGx7YnThAJ2QYh7hAJTZYwPIuIgFA
J6ZYUThEn2e1U2e1U6hAUnhAUnRYn2IQg7o1I7EYUnRKU6mYFBIYF2Q4WvaYp7f3JThAOki
Ki68........)
        };

document.opener = function() {
            setTimeout("Suspicious()", 5000);
        }
</script>
</head>
<body onload="document.opener();">
</body>
</html>
```

Figure 7

METHOD AND SYSTEM FOR MALICIOUS CODE DETECTION

This application is the U.S. national phase of International Application No. PCT/GB2013/000124, filed 20 Mar. 2013, which designated the U.S. and claims priority to EP Application No. 12250066.3, filed 20 Mar. 2012, the entire contents of each of which are hereby incorporated by reference.

TECHNICAL FIELD

The present invention relates to a method and system for detecting malicious code, and in specific embodiments to detecting malicious code inserted into web pages. In some embodiments the code is detected in a web page based on one or more criteria, and detected code is then caused to de-armour so that it can be reviewed by, existing anti-virus or intrusion detection systems.

BACKGROUND TO THE INVENTION AND PRIOR ART

There has arisen in recent years an increased risk from malicious code (often referred to as "malware", of which a "virus" would be one type) being presented to user computers from websites. More specifically, one of the favourite attack methods of hackers over the last few years has been to inject malicious code into the web page code of legitimate websites. Unsuspecting users will then have a virus or other malware downloaded to their personal computer by visiting an infected web page. Sometimes, the virus or malware is downloaded without any user interaction; in other cases, the user is prompted to click a button to download what appears to be a legitimate file and then receives the malware. Such an attack vector is particularly insidious, as using web pages for malware propagation allows a malware to propagate using port 80 as HTTP traffic. In all systems, the HTTP port 80 is always open because otherwise a closed HTTP port would mean that the user would not be able to browse the Internet. As a consequence, the previous anti-malware measure of the prior art involving blocking particular ports is not effective against such attacks, as the HTTP port cannot be practically blocked without removing web browsing functionality.

The problem of injected code in web pages is not limited to the inability to block ports. In addition, the injected code uses "armour" techniques to disguise itself from any anti-virus or other host intrusion detection system that may be running on the target system. For example, "polymorphic worm" type malware that is injected into a web page is one of the most prevalent types of attack on the Internet because it is able to evade current host intrusion detection systems. The reasons for this are as discussed further below.

Firstly, the malware is injected into a web page that may be received from a legitimate server, and hence the web page code may be implicitly trusted by the target system user. Moreover, the malware is typically encrypted so that the malicious content is obfuscated and will not be easily detected using a traditional anti-virus scanning engine. More seriously, however, because the malware is contained within the code of a web page then once the malware is received at the target victim system it will run in the web browser memory that is considered a legitimate application by the host intrusion detection system (HIDS) running on the target system. In this regard, usually when a user tries to run an application or a file then a typical host intrusion detection system (HIDS) first scans the file for any malicious content. In addition, once the file is uploaded to memory then the HIDS will usually also scan the memory content for that file for any malicious code. However, a typical HIDS will perform such an operation only once for a particular file and memory range, and will then consider the application and the memory where the application is running as benign. Thus, if a malware manages to inject itself into the memory location of a benign program (such as the web browser) then it will evade detection because the HIDS has already scanned the memory and considered the application as benign. As a result, the injected malware will run with the same O/S privilege as the web browser, and hence when run may be able to infect the target victim system.

Thus far, therefore, injected malicious code in web pages is able to infect a target system by using encryption to obfuscate itself from traditional anti-virus scanning, and exploiting the system privileges already given to a web browser from a previous check of the web browser memory space by an existing anti-virus or other HIDS. However, even once the malicious code has been run and is still in memory it is not usually possible for a HIDS to detect the code, due to the automatic garbage collection functions of typical web browsers.

More specifically, when a web browser runs a script in memory, then once the script finishes running all the memory locations that are used by the script will be reallocated. The reason for web browsers to do this is to save memory and restrict memory usage for the web browser. Web browsers usually use an automated garbage collector process that allows web browsers to reclaim the memory space in order for the space to be reallocated to the browser after a script has finished running. By exploiting this mechanism, once a malware comprising injected web page code has run in the memory and infected the victim machine then the web browser garbage collector will usually remove the malware code from memory. This makes it hard to scan the memory to detect the malicious code, and adds an extra layer of evasion armouring to the malicious code.

US 2010/0235913 describes methods and systems for determining whether a collection of data not expected to include executable code is suspected of containing malicious executable code. Such collections of data are generally described as being data files or documents such as word-processing documents, music files, picture files, etc. The type of malware targeted by US 2010/0235913 includes polymorphic programs including an encrypted payload and a plain text decryption engine. The methods rely on identifying short portions of data which might correspond to executable instructions (e.g. as part of a decryption engine) and attempting to identify these as forming (a part of) an executable program. It does not address the case of how to detect malicious code within a file or collection of data which is expected to include executable instructions such as a web page containing java scripts.

SUMMARY OF THE INVENTION

Embodiments of the present invention address the above noted problems of detection of malicious code injected into otherwise legitimate web pages using a two stage process. In the first detection stage, malicious code is first detected within otherwise legitimate web-page code by filtering received web-page code to detect strings therein that meet one or more predetermined criteria. One first such criterion is that the length of any particular candidate string found in the web-page code must be longer than a threshold criterion, for example longer than 2000 characters. In this regard, malicious code injected into web pages usually comprises three parts, being a decryption algorithm, Exploit and a shell code, and being encrypted is often several thousand characters in length. Hence a long, apparently random string in a web-page is suspicious. A second criterion is whether, if the web-page is requested again, the web page code contains a long string at the same location, but which is different from the string that was located at the same location previously. If there is a difference, then that may be indicative of a polymorphic malware (i.e. a malware which changes itself slightly from infection to infection, to try and evade detection by bitwise anti-virus scanning systems). Finally, a third criterion is whether the string is located between scripting tags that will indicate to the browser that the string is an executable script.

Once the first stage has detected a suspicious string, then the suspicious string is passed to the second stage of processing, which acts to effectively "de-armour" the malware, so that it can be inspected by the existing HIDS. This is achieved in the preferred embodiment by causing the suspicious string to run in a "sand-box" (i.e. an isolated part of the system memory and without access to full system resources), with the memory garbage collection process disabled such that after the script contained within the string has run the memory contents may be dumped to a file and inspected by the existing HIDS or anti-virus system. In a less preferred embodiment, instead of using the sandbox the detected script may be run in the system memory, but again with the garbage collection process disabled, so that the HIDS may inspect the memory after script execution to identify the malware, and then take remedial action to remove any infection. In either embodiment all that is required is a lightweight proxy to cause the detected script to be run, which has the effect of removing the armouring from the script (the script will de-crypt itself, revealing the executable shell code and Exploit that form the malware and which can then be run from memory), and then the existing HIDS is used to identify the un-armoured malware. As a consequence, the existing HIDS or anti-virus system is still utilised, and no un-necessary systems complication is added.

In view of the above, from one aspect there is provided a method for detecting malicious code in received web pages. The method includes receiving web page code at a host system from a web server, and scanning the received web page code to determine the presence therein of one or more suspect code strings meeting one or more detection criteria. Any suspect code strings that meet the one or more detection criteria are then processed so as to de-armour the suspect code strings, and the results of the processing are then inspected with an existing anti-virus or other host intrusion detection system (HIDS) already installed on the host system to determine whether the processed code strings contain malicious code. In this regard, in order to de-armour the string the processing effectively tricks the suspect code string into revealing any shell code and exploits contained within the string, for example by allowing the string to decrypt itself into memory. Any revealed code can then be inspected by the existing anti-virus or other HIDS, and thereby no separate anti-virus system is required to detect malicious code injected into web pages.

In one embodiment a first detection criterion is whether a code string in the received web page is of an un-interrupted length equal to or greater than a predetermined detection length threshold. For example, in one embodiment the detection length threshold is a minimum number of characters for a malicious shell code, for example 2000 characters or more.

In one embodiment a second detection criterion is whether, on receiving the same web-page code a second or subsequent time, a code string therein is polymorphic. In this respect, a suspect code string can be inspected to see whether it changes at all from one download to the next. If it does change then the string is polymorphic, which is often an evasion tactic used by malicious code to evade detection by anti-virus systems.

In one embodiment a third detection criterion is whether a code string is encapsulated between scripting tags that indicate to a web browser that the code strings should be run as a script by the browser. In this regard, malicious code must be executed by a browser as a script in order to allow the code to first decrypt itself, and then run any decrypted shell code. The presence of a long string between scripting tags is therefore evidence of possible suspect code.

In a preferred embodiment a code string must meet at least two or more of the detection criteria to be considered a suspect code string. In this regard, the first and second detection criteria noted above are more indicative of a suspect string than the third criterion. Therefore, in some embodiments a code string must meet any of the first and third criteria, or the second and third criteria, or the first and second criteria in order to be considered as suspect. Most preferably, however, a code string must meet all three of the above criteria to be considered suspect.

In one embodiment the processing comprises encapsulating a suspect code string that meets the detection criteria within a HTML DOM object in a test script, and running the test script. In this respect, a DOM object is allocated its own process thread, which can be used as a reference for the suspect code string when it is processed.

In one embodiment, the processing further comprises suspending a browser automatic garbage collection function so that the results of the processing are at least temporarily retained in memory. This allows the memory contents to be downloaded to a file, for example, to be passed to the host anti-virus system, or for the anti-virus system to inspect the memory contents directly.

In one embodiment the processing further comprises allowing a suspect code string to de-crypt itself into memory to reveal any executable code. As noted above, this helps to de-armour the suspect code string, so that it may be inspected by the built-in anti-virus systems.

In one embodiment the processing takes place in a sand-box so as to protect the host system from infection by the one or more suspect code strings. This helps to ensure that the suspect code string cannot infect the host system.

As noted previously, in one embodiment the processing comprises storing the contents of the memory where the suspect code string was run in a file, and passing the file to the host anti-virus or other HIDS for determination as to whether the memory contents represent malicious code. This allows the existing, anti-virus or HIDS system to be utilised further.

In one embodiment, if it is determined by the host anti-virus or other HIDS that a suspect code string contains malicious code then one or more of the following actions is taken: i) displaying a warning to the host system user; and/or ii) removing the suspect code string from the received web page code before passing the received web page code to a web browser for display; and/or iii) preventing the web browser from displaying the received web page code. In this way, the malicious code is prevented from being passed to the browser, and hence infection by the code is prevented.

From another aspect there is also provided a computer program or suite of computer programs so arranged such that when executed by a computer system it/they cause(s) the computer system to operate in accordance with the method of the preceding aspect. In addition a computer readable medium storing such a computer program or at least one of such a suite of computer programs is also provided.

From a yet further aspect there is provided a system for detecting malicious code in received web pages, the system comprising: at least one processor; memory; and at least one computer readable medium storing a computer program or suite of computer programs so arranged such that when loaded into memory and executed by the processor they cause the system to operate in accordance with the method of the above first aspect.

A fourth aspect of the invention provides a system for detecting malicious code in received web pages, the system comprising: means for receiving web page code at a host system from a web server; means for scanning the received web page code to determine the presence therein of one or more suspect code strings meeting one or more detection criteria; means for processing the suspect code strings that meet the one or more detection criteria so as to de-armour the suspect code strings; and means for inspecting the results of the processing with an existing anti-virus or other host intrusion detection system (HIDS) already installed on the host system to determine whether the processed code strings contain malicious code.

In the fourth aspect above various further features may be included, as described in respect of the first aspect.

A fifth aspect of the invention also provides an apparatus for detecting malicious code in received web pages, the apparatus comprising: a network interface arranged to receive web page code; a code scanner arranged to scan received web page code to determine the existence of one or more suspect code strings that have properties corresponding to one or more detection criteria; a processor arranged to process the suspect code string so as to de-armour the string; and an anti-virus or host intrusion detection system arranged to examine the de-armoured string and determine if the string comprises malicious code.

BRIEF DESCRIPTION OF THE DRAWINGS

Further features and advantages of embodiments of the present invention will become apparent from the following description of embodiments thereof, presented by way of example only, and with reference to the accompanying drawings, wherein like reference numerals refer to like parts, and wherein.

DESCRIPTION OF THE EMBODIMENTS

Figure 3:
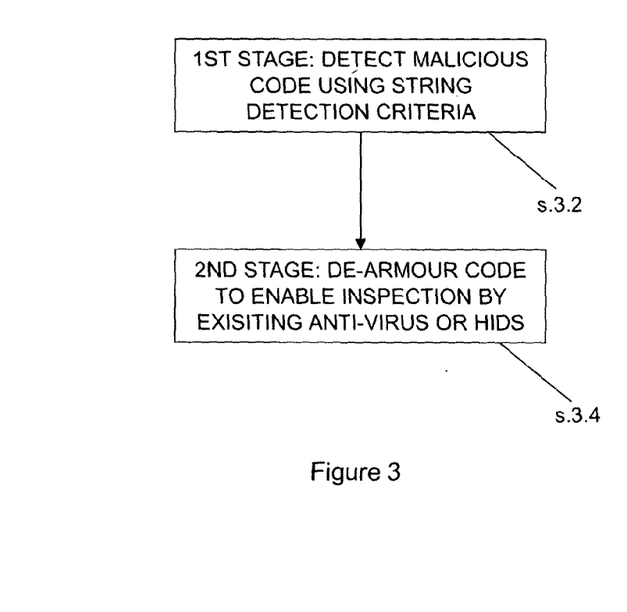
FIG. 3 is a flow diagram illustrating an overview of an embodiment of the invention.

An overview of the operation of embodiments of the invention is shown in FIG. 3. In this regard, embodiments of the invention are directed towards detecting and identifying malicious code injected into other legitimate web pages. The detection is divided into two processes as shown in FIG. 3. The first process at step 3.2 is to detect a malicious code string within received web page code using a set of one or more criteria. The criteria include length of the string, as well as whether the string changes between received instances, and the status of the string within the web page code, particularly whether it is encapsulated between scripting tags, or otherwise indicated as being executable. The second process at step 3.4 is based on using a proxy that will help in extracting and scanning the decrypted code against any malicious content. In particular the second phase acts to remove the armour and evasion features that may be built into the malicious code, so that the code may then be inspected by the existing anti-virus or other HIDS present on the target system. For example, the code may be caused to run in a sand-box so that it decrypts itself. At the same time, the automatic garbage collection function of the web browser is disabled, so that once the code has decrypted and run it is still available in memory to be inspected. Inspection may take place by dumping the memory contents to a file and then passing the file for inspection to the existing anti-virus or other HIDS.

Figure 1:
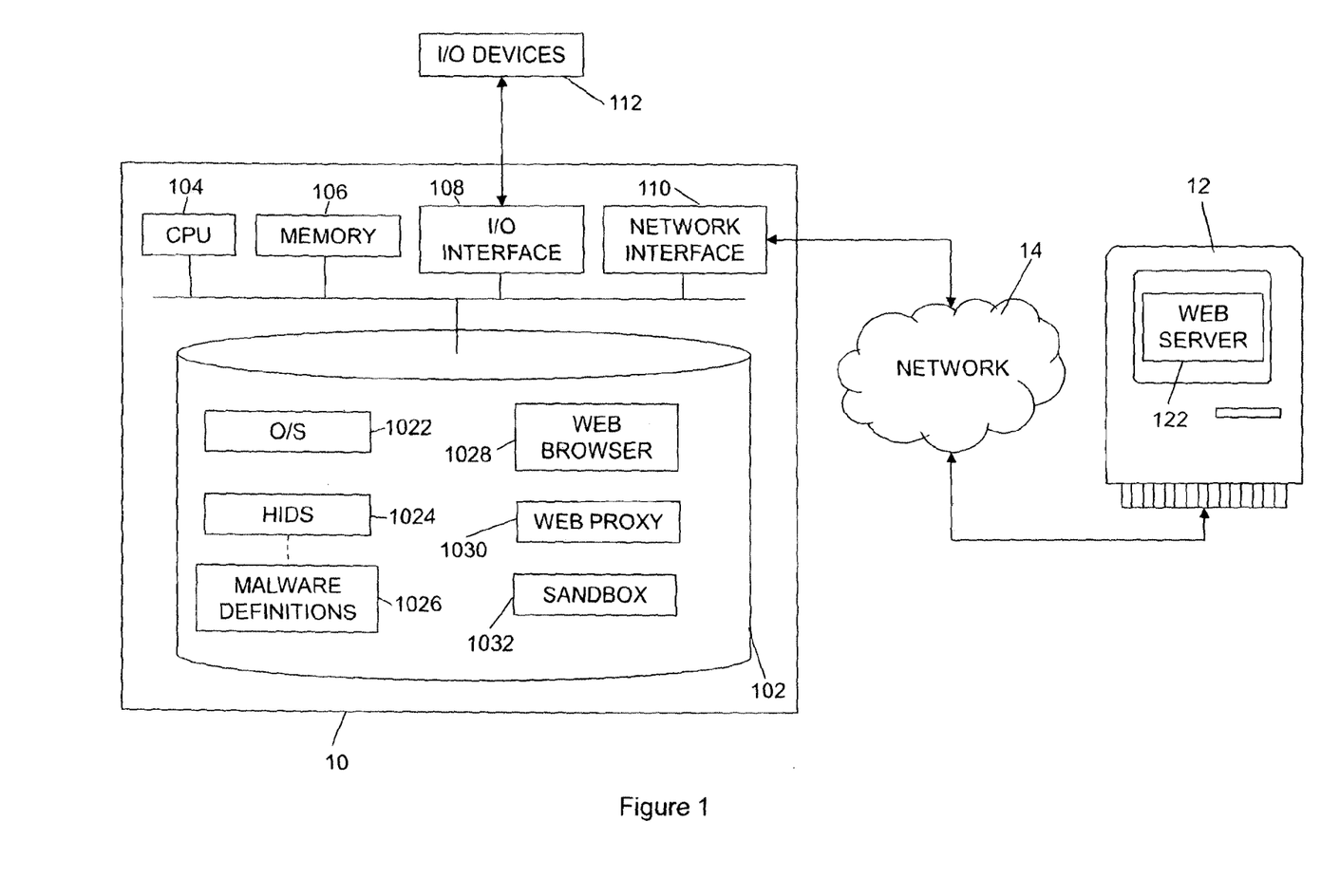
FIG. 1 is a system block diagram of a system of an embodiment of the invention.

In view of the above overview, FIG. 1 illustrates a system according to a first embodiment of the invention. Within FIG. 1 a computer system 10 is provided with a CPU 104, memory 106, one or more input/output interfaces 108 (such as video and audio output controllers, as well as user input device controllers such as any one or more of a keyboard, touchscreen, or mouse controller, for example) and one or more network interfaces 108 (such as one or more wired or wireless network adapters, for example). In addition is provided a computer readable medium 102 such as a hard disk, flash drive, or other (usually non-volatile) data storage on which is stored the system operating system 1022, as well as a host intrusion detection system or anti-virus program 1024. The HIDS or anti-virus program 1024 is provided with a database of malware definitions 1026 that is updatable and allows the HIDS 1024 to recognise and identify malware within received data files, or when loaded in memory. Also provided is a web browser program 1028, which when run allows the system user to browse the World Wide Web. In this regard, the computer system 10 communicates via the network interface 108 with one or more remote servers 12, via a network 14 such as the Internet or an intranet. The remote servers 12 run respective web servers 122 that act to receive HTTP GET requests from the web browser program 1028, and to provide the requested web pages in response to the requests, for display by the web browser program 1028.

As described so far, the system 102 is conventional, and has the problems noted earlier in detecting malicious code injected into legitimate web pages. That is, when the system user launches the web browser the HIDS or anti-virus system 1024 scans the web browser code when running in memory and will find it to be legitimate. The memory space in which the web browser runs is then considered by the HIDS to be malware free, and code therein to be allowed to run. The web browser may then download a web page that contains malicious code, but because the code is encrypted it will not be detected by a typical bitwise scan of the received web-page code by the HIDS 1024, and hence will be allowed to be passed to an executed by the browser. Once located in the browser memory space the malicious code is run, which results in decryption and execution of the malicious shell code, thereby infecting the system. The infection is then covered up by the browser itself, by virtue of the automatic garbage collection function of the browser removing the executed script from the browser memory space after it is executed.

Figure 2:
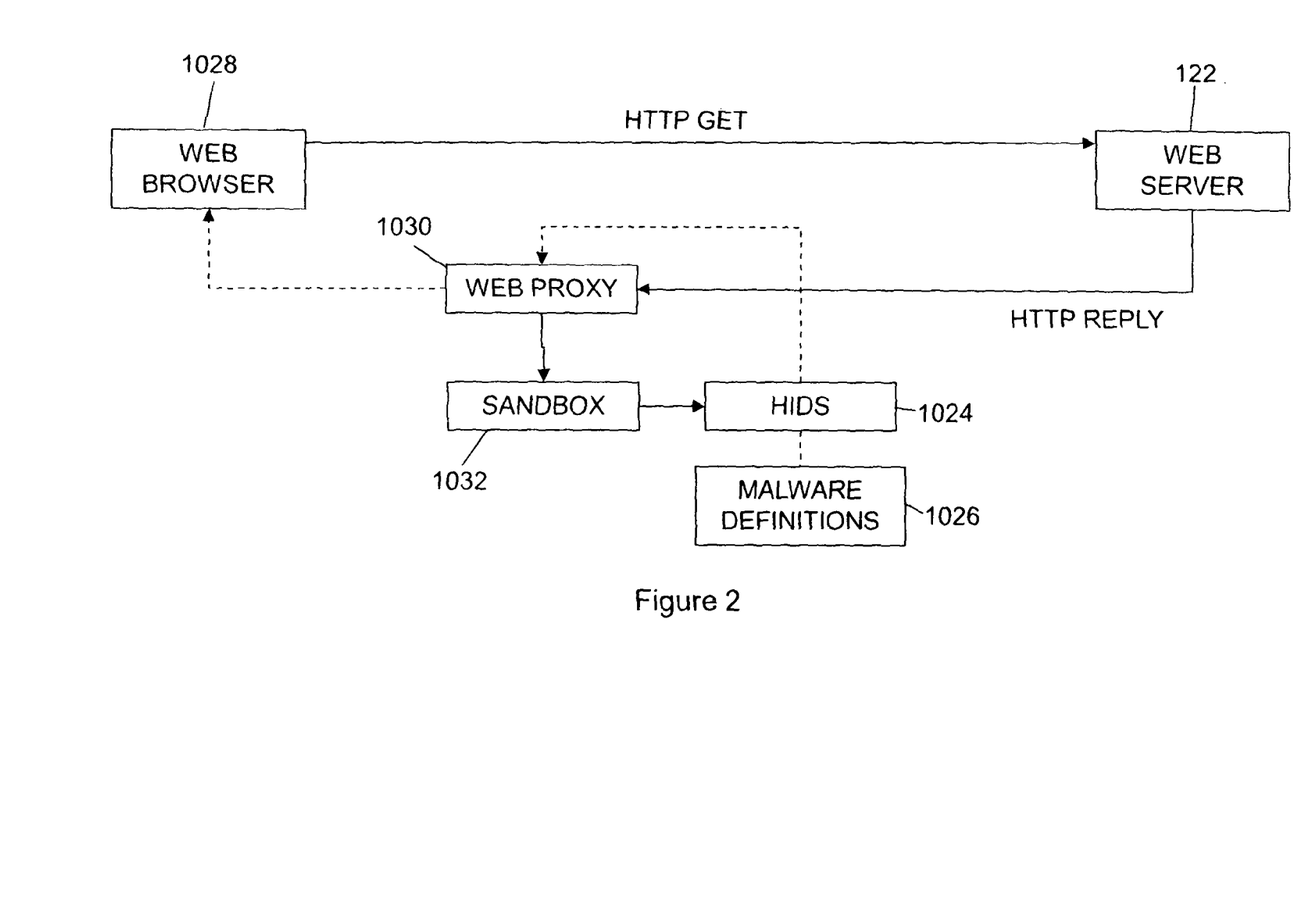
FIG. 2 is a communications flow diagram illustrating data flows in an embodiment of the invention.

The present embodiment addresses the above issue by the provision of a web proxy program 1030, together with a sandbox controller program 1032. The web proxy 1030, which may be implemented as a plug-in to the existing web browser 1028 or alternatively to the HIDS 1024, acts to intercept and filter received web page code before it is passed to the browser, as shown in FIG. 2. Here, the web browser 1028 sends HTTP GET requests to a remote web server 1022 in a conventional manner, but the resulting HTTP reply containing the requested web page code sent by the web server 1022 is intercepted by the web proxy program 1030, and inspected to determine whether it contains any, suspect malicious code. The criteria used to determine if code is suspicious will be described in more detail later. If suspect malicious code is detected, in the present embodiment the suspect is code then caused to run in a sandbox controlled by sandbox controller program 1032. In this regard, a "sandbox" is a controlled area of memory in which programs may be run in isolation from the rest of the system, without full system access privileges. Such operation allows possible suspect programs to be executed to determine their operation without putting the whole system at risk of infection. The provision and operation of a sandbox is described in our earlier European Patent Application No. 11250227.3 to which reference is made for the details of sand box provision and operation. In addition, the concept and operation of a sandbox is otherwise known in the art, with sandboxing capabilities built into many operating systems such as iOS or Mac OS X (both from Apple Inc, Cupertino, Calif., USA), as well as existing anti-virus programs such as Avast!, available from Avast Software A.S. of Prague, CZ, or Comodo Internet Security, from Comodo Group Inc, N.J., USA. As a consequence of being well known in the art, the internal operation of the sandbox (i.e. how the sandbox functionality is provided) is beyond the scope of the present application.

As noted above, running the suspect malicious code in a sand-box allows the code to run without putting the system at risk. In addition, once the code has run, the memory contents of the memory in which the code ran can be stored in a file, and passed to the existing anti-virus or HIDS for inspection and determination whether the received code is in fact malicious. This determination is then fed back from the HIDS 1024 to the web proxy program 1030, and if the code is not determined malicious then the web proxy program 1030 may allow the web page code to be passed to the web browser, where it is then run again by the browser for the user.

On the other hand, if the anti-virus or HIDS 1024 determines that the code is malicious, then several options are available. The first and most simple is to simply stop the web-page from being passed to the browser. In this regard, a message should be displayed to the user to inform the user of the determination of malicious code, and the reason for the action.

Alternatively, the malicious code may be filtered out by the web proxy, and the filtered web page then passed to the web browser. In this case, a message may be displayed to the user informing them of this action, or may not. In many cases whether a message is displayed may depend on the user's network security settings, and the level of expertise of the user.

A further alternative is to display a message to the user, and give the user the choice of either running all the received web page code, filtering the malicious code out and running the remainder, or not running any of the received web page code at all. Such an option is likely only viable for expert users who wish to retain full control over their systems.

One of the main advantages of the above described operation is that it is the existing anti-virus or HIDS 1024 that receives the memory dump from the sandbox and inspects the code to determine whether or not it is malicious. In this respect, many organisations and private users spend significant amounts of time and money in keeping anti-virus and intrusion detection systems up to date across many user systems. There is therefore considerable investment in existing anti-virus and HIDS systems, which embodiments of the invention may leverage for code identification, meaning that no separate anti-virus or HIDS system is necessary.

Figure 4:
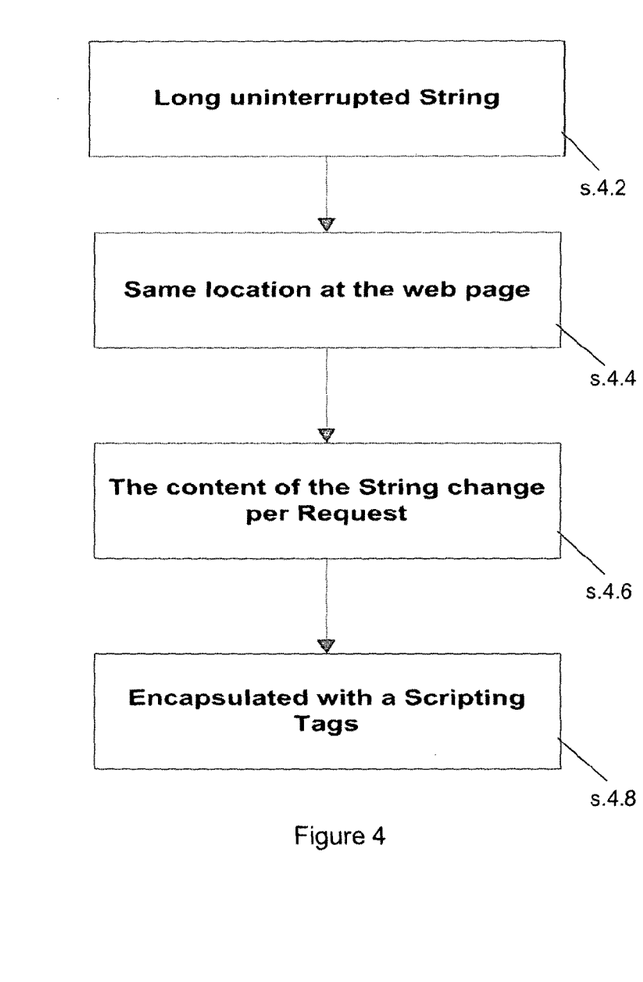
FIG. 4 is a flow diagram illustrating a first detection phase in an embodiment of the invention.

Regarding the operation of the web proxy program 1030 to first identify suspect malicious code, the operation of the program is shown in more detail in FIG. 4. Here, the intrusion detection proxy 1030 first scans the received web page for any long uninterrupted string (s.4.2). Then, once intrusion detection proxy 1030 detects a web page that contains a long uninterrupted string it will try to locate the location in the page where the long uninterrupted string is present. In the next step (s.4.4), it will request the same page again from the web server 122 and in each reply the intrusion detection proxy 1030 will extract the long uninterrupted string and compare with previously received strings (s.4.6). If in each request the uninterrupted string is different then that is a sign of a polymorphic string that has been injected into the web page. Finally, the proxy will also search for the scripting tags before and after the long uninterrupted string. If the tags belong to a scripting language such as JavaScript or VBScript then that is further indication of malicious activity.

In more detail, the process of detection performed by the web proxy program 1030 is as follows.

Figure 5:
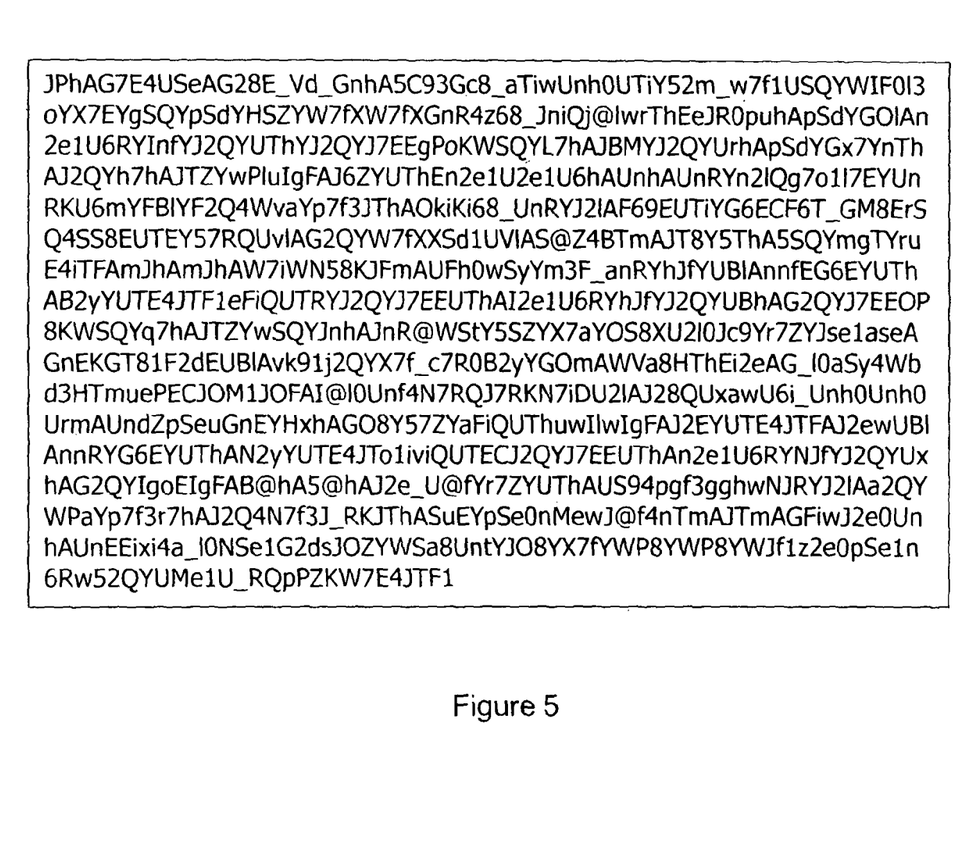
FIG. 5 is an example malicious code string.

Firstly, at step 4.2, detect any long uninterrupted string in a single received web page. To detect such strings the scanning engine in the web proxy 1030 should be able to scan the whole received individual web page contents text and extract each single line in the web page text separated by space characters, new lines, and carriage returns. Then the scanning engine should identify and return the length of each line in the source code of the received web page. Normally, from our observation of the attack we notice that because the malware is injected into the web page content then it will usually be represented in the web page as a very long uninterrupted string that has the format shown in FIG. 5 i.e. a long, continuous string of apparently random alphanumeric characters. The random nature of the string is due to the encryption that is applied to the malware, resulting in a form of ciphertext string. Note that the string in FIG. 5 is typically just part of a very long uncharacteristically uninterrupted string that can go up to few pages, and the content will vary in each received web page because of the effect of the polymorphic injected malware. In contrast, typical legitimate web page text and script is composed of relatively short length words or sentences. So by first detecting any long uninterrupted strings, we are able to identify suspect injected malware, for further analysis. In order to determine string length a simple script as set out below may be used to detect such a long string:

```
Line_Length = 0
Lines= re.split("[\s, \n, \r]", Web_Page_Content)
for Line in Lines:
    if len(Line) > Line_Length:
        Line_Length = len(Line)
    If Line_Length > 2000
        Location = string.find(Web_Page_Content, Line)
        Suspicious_Page = Web_Page_Content
```

The above script will scan a whole received web page and calculate the length of each line in the web page source code, looking for any uninterrupted string that is longer than 2000 characters in one single line that has no space characters, new lines, or carriage returns. The threshold length of 2000 may be varied, for example by a system administrator, and typically we have found injected malware to be many times longer than this. However, we believe that a 2000 character limit is reasonable, as this is about the minimum number of characters required to build a shell code.

Note also that it is possible that the malware may be injected into several parts of the web page code, in order to try and defeat such threshold based techniques operating on single strings. In such a case the strings would have scripting tags that would act to concatenate the individual strings together into the single malware string on parsing in the web browser. Therefore, in addition to looking for single strings in the web page source code, it is also possible to identify multiple strings that are intended to be concatenated together, by looking for the concatenation scripting tags, and summing the length of the strings together to which the tags relate to determine if the summed length is greater than the threshold.

The next step (step 4.4) is to find the location of the identified long string at the web page in order to compare it with the string received after requesting the same web page. As we see from the previous script it will locate the long uninterrupted string index in the web page and define that particular page as suspicious for further investigation.

Having identified the location of the string the detection engine will need to request the same web page from the web server for N number of times (for example 2 to 4 times) and extract the long uncharacteristically uninterrupted string from each received web page reply from the same location (step 4.6). The newly received string is then compared character by character by the immediately previously received string. Any difference in the strings means that the strings have changed, which is an indication of a polymorphic property that changes the content of the string each time it is sent in the same web page. Such polymorphic behaviour is highly indicative of possible malware, and hence indicates that the string should be investigated further.

Finally, as a final check at step 4.8 a check is made as to whether the detected strings are encapsulated inside SCRIPT Tags: basically in order for the long uninterrupted string to run and infect the victim machine it has to be encapsulated inside a Script Tags such as (JavaScript, VBScript, etc) that will allow the injected malware to run inside the web page and infect the victim machine.

The first detection stage therefore acts to identify suspicious strings in received web page code that may be malware. In particular suspicious strings are identified based on criteria relating to the length of the string, and in particular whether it is long enough to represent meaningful executable shell code. In addition, the second check relating to whether the string is polymorphic also helps to identify whether the string is suspicious, and the third check determines whether it is contained within appropriate scripting tags so that it would be run by the web browser. Of all of these criteria, the first two are more indicative than the last, and may be used in isolation, although are preferably used together. Once the web proxy confirms that string is suspicious based on these criteria processing moves to the second stage in order to check the contents of the string and confirm if it in fact has any malicious content.

The detailed operation of the second stage is described next with respect to FIGS. 6 and 7.

From the first stage of detection we manage to identify the location of the possible malware in a received web page and the exact location in the infected web page. In the second stage of detection we then attempt to de-armour the suspect code by running the code in a separate memory that can be traced and analysed outside the overall memory of the web browser, and by making sure that the memory content (where the suspicious string or script is running) is not flushed or removed by the garbage collector of the web browser and maintained in memory until we analyse it. To achieve this functionality, the de-armouring process follows the steps shown in FIG. 6.

Figure 6:
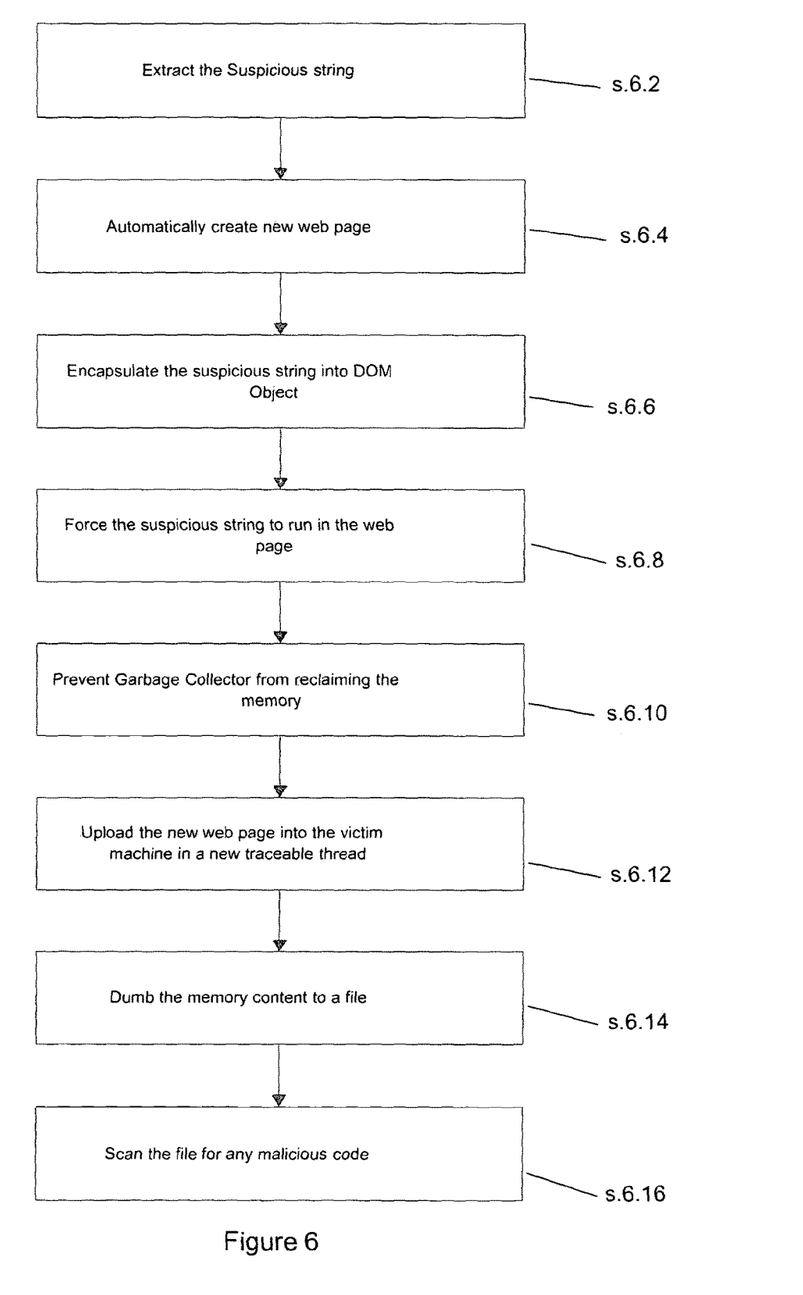
FIG. 6 is a flow diagram illustrating a second de-armouring phase in an embodiment of the invention.
Figure 7:
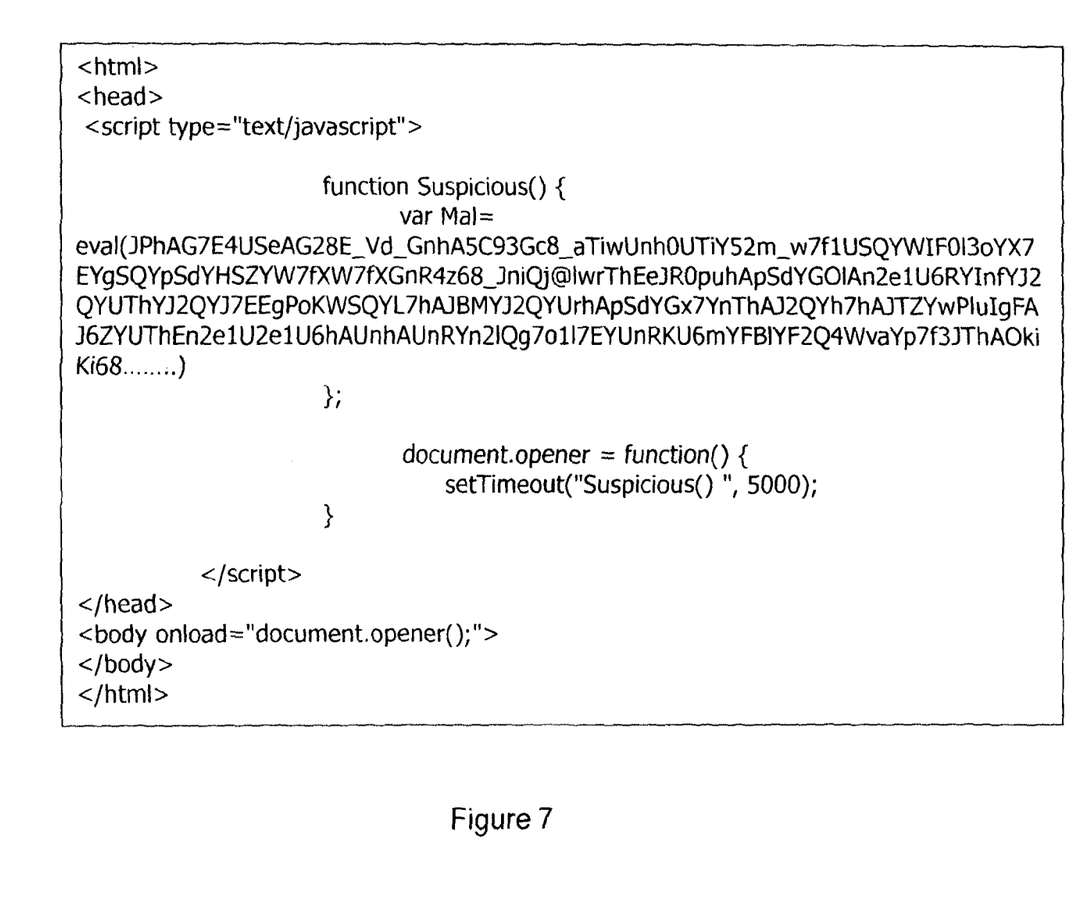
FIG. 7 is example script code used to cause a detected malicious code string to be run in a controlled manner so that it may be examined in an embodiment of the invention.

With reference to FIG. 6, the following are the steps that need to be done in order to have access to the memory where the malware is running, such that it can then be dumped to a file and scanned using the host anti-virus solution.

Firstly, at step 6.2 the intrusion detection proxy 1030 needs to extract the uninterrupted string from the received web page and automatically creates a new web page that will allow the decrypted malware to be extracted from memory and analysed.

Next, at steps 6.4 and 6.6 the Intrusion Detection proxy 1030 automatically creates a web page that has HTML code that will encapsulate the suspicious uninterrupted string into a DOM object. Normally browsers allocate memory space for a DOM object inside the web page. So the DOM object will act as a reference to the script tags. In that way, we guarantee that the browser will hold the contents of the suspicious script in memory, and which will be referenced by the DOM object we created. In this respect a DOM object is a mechanism that allows HTML to reference elements inside the web page and allocate a dedicated process thread to process the object. By referencing the suspicious string with a DOM object then we make sure that the suspicious string will be referenced in memory based on the process thread that is allocated to run that DOM object.

Next, at step 6.8 the proxy 1030 needs to force the process thread to run with the new DOM object. In order to do that, the proxy will extract the long suspicious string from the original web page and insert that string into the EVAL( ) function in the newly created web page as shown in FIG. 7. By using this technique, we force the browser to run the script under the newly referenced DOM object.

However, in order to prevent the automated garbage collector from reclaiming the memory and erasing everything held by the DOM object we have to use a timer that will allow the content of the memory to stay without being reclaimed. To do that we use a setTimeout( ) function, at step 6.10. This suspends the operation of the garbage collector to give time for the suspicious script to run, and the resulting memory contents to be dumped to a file for inspection. As mentioned previously, the garbage collector is an automatic process that allows the reclaiming of memory space in order for it to be reallocated to the browser.

Having established the DOM object and set the Eval( ) and setTimeout( ) function, at step 6.12 we then upload the whole web page to the victim machine memory for investigation. To do that we add the onload( ) function to automatically load the web page into the web browser at the victim machine.

By using the above techniques we make sure that the suspicious long string is loaded into a separate memory space under the web browser and the garbage collector has been postponed so as not to reclaim the memory. Once the script has run and decrypted itself we can then use any memory dump tools such as Process Explorer or MANDIANT Memoryze to dump the memory contents into a file (s.6.14). The memory contents will contain the decrypted Exploit and the shell code of the malware. Once we dump the memory content we can then scan the file using any existing anti-virus scan engine or other HIDS, to look for any malicious code in the decrypted string (s.6.16).

As noted previously, the whole process can be run inside a sandbox in order not to infect the system and to produce the decrypted result and pass it to the host anti-virus for inspection and determination as to whether it is in fact malicious.

Various modifications may be made to the above described embodiment to provide further embodiments. For example, within the above embodiment the first detection stage uses three criteria to determine if a found string is potentially malicious, such that it should be examined by the second stage. In other embodiments it is not necessary to use all three criteria, and for example in one embodiment only the length criterion may be used to identify suspicious strings. That is, the proxy examines the incoming web page code to find uninterrupted long strings greater than the detection threshold (e.g. 2000 characters), and all such strings are then passed to the second stage for further examination and de-armouring, if appropriate. In other embodiments the length criterion may be used with the polymorphic criterion (i.e. whether the string changes from download to download) to determine if a string is suspicious.

In addition, in another embodiment it is not necessary in the second stage (the de-armouring stage) to run the detected code in a sandbox. Instead, the suspicious script may be allowed to run in the web browser memory space, but again with garbage collection suspended, so that the resulting memory contents may be examined by the host anti-virus or other HIDS system 1024. This alternative embodiment does run the risk that running the script in the browser web space will infect the target system as intended by the malware authors, but provided that the anti-virus or other HIDS 1024 is able to then identify the malware after it has run, and remove any infection thus caused, then such an embodiment is also feasible.

Various further modifications, whether by addition, substitution or deletion, will be apparent to the intended reader, being a person skilled in the art, any and all such modifications being intended to be encompassed by the appended claims.

The invention claimed is:

1. A method for detecting malicious code in received web pages, comprising:
   executing instructions using a computer processing system including a computer processor and a memory storing instructions which upon execution by the computer processor provide operation comprising:
   receiving web page code at a host system from a web server;
   scanning the received web page code to determine the presence therein of one or more suspect code strings meeting one or more detection criteria;
   processing the suspect code strings that meet the one or more detection criteria so as to de-armour the suspect code strings;
   inspecting the results of the processing with an existing anti-virus or other host intrusion detection system (HIDS) already installed on the host system to determine whether the processed code strings contain malicious code, the existing anti-virus or other host intrusion detection system already installed on the host system being provided with a database of malware definitions which is updatable and being operable to recognize and identify malware within received data files, or when loaded in the memory; and
   suspending a browser automatic garbage collection function so that the results of the processing are at least temporarily retained in the memory.

2. A method according to claim 1, wherein a first detection criterion is whether a code string in the received web page is of an un-interrupted length equal to or greater than a predetermined detection length threshold.

3. A method according to claim 2, wherein the detection length threshold is a minimum number of characters for a shell code.

4. A method according to claim 1, wherein a second detection criterion is whether a code string is polymorphic.

5. A method according to claim 1, wherein a third detection criterion is whether a code string is encapsulated between scripting tags that indicate to a web browser that the code strings should be run as a script by the browser.

6. A method according to claim 1, wherein a code string must meet at least two or more of the detection criteria to be considered a suspect code string.

7. A method according to claim 1, wherein the processing comprises encapsulating a suspect code string that meets the detection criteria within a HTML DOM object in a test script, and running the test script.

8. A method according to claim 1, wherein the processing further comprises allowing a suspect code string to de-crypt itself into memory to reveal any executable code.

9. A method according to claim 1, wherein the processing takes place in a sand-box so as to protect the host system from infection by the one or more suspect code strings.

10. A method according to claim 1, wherein the processing comprises storing the contents of the memory where the suspect code string was run in a file, and passing the file to the host anti-virus or other HIDS for determination as to whether the memory contents represent malicious code.

11. A method according to claim 1, and further comprising, if it is determined by the host anti-virus or other HIDS that a suspect code string contains malicious code then taking one or more of the following actions:
   i) displaying a warning to the host system user; and/or
   ii) removing the suspect code string from the received web page code before passing the received web page code to a web browser for display; and/or
   iii) preventing the web browser from displaying the received web page code.

12. A non-transitory computer readable medium storing a computer program or at least one of a suite of computer programs which upon execution by a computer processing system including a computer processor performs steps comprising:

receiving web page code at a host system from a web server;

scanning the received web page code to determine the presence therein of one or more suspect code strings meeting one or more detection criteria;

processing the suspect code strings that meet the one or more detection criteria so as to de-armour the suspect code strings;

inspecting the results of the processing with an existing anti-virus or other host intrusion detection system (HIDS) already installed on the host system to determine whether the processed code strings contain malicious code, the existing anti-virus or other host intrusion detection system already installed on the host system being provided with a database of malware definitions which is updatable and being operable to recognize and identify malware within received data files, or when loaded in memory; and suspending a browser automatic garbage collection function so that the results of the processing are at least temporarily retained in the memory.

13. A system for detecting malicious code in received web pages, the system comprising:

at least one computer processor;

memory; and at least one computer readable medium storing a computer program or suite of computer programs so arranged such that when loaded into the memory and executed by the computer processor they cause the system to be at least configured to:

receive web page code at a host system from a web server;

scan the received web page code to determine the presence therein of one or more suspect code strings meeting one or more detection criteria;

process the suspect code strings that meet the one or more detection criteria so as to de-armour the suspect code strings;

inspect the results of the processing with an existing anti-virus or other host intrusion detection system (HIDS) already installed on the host system to determine whether the processed code strings contain malicious code, the existing anti-virus or other host intrusion detection system already installed on the host system being provided with a database of malware definitions which is updatable and being operable to recognize and identify malware within received data files, or when loaded in the memory; and suspend a browser automatic garbage collection function so that the results of the processing are at least temporarily retained in the memory.

14. A method according to claim 3, wherein the minimum number of characters forming the detection length threshold is 2000 characters.

\* \* \* \* \*